Jan. 20, 1970  J. A. RIETDIJK  3,491,184
METHOD OF MANUFACTURING HEAT EXCHANGERS
Filed Oct. 31, 1966  2 Sheets-Sheet 1

INVENTOR.
JOHAN A. RIETDIJK
BY
AGENT

United States Patent Office 3,491,184
Patented Jan. 20, 1970

3,491,184
METHOD OF MANUFACTURING HEAT EXCHANGERS
Johan Adriaan Rietdijk, Emmasingel, Eindhoven, Netherlands, assignor to U.S. Philips Corporation, New York, N.Y., a corporation of Delaware
Filed Oct. 31, 1966, Ser. No. 590,944
Claims priority, application Netherlands, Nov. 11, 1965, 6514626
Int. Cl. B29d 3/00; F28f 9/00; B28b 7/22
U.S. Cl. 264—254      12 Claims

ABSTRACT OF THE DISCLOSURE

A method of making a heat exchanger which comprises the steps of disposing in an envelope a stack of gas-pervious layers; forming transversely a secondary layer of initially-liquid, low-melting temperature material and an adjacent layer of initially-liquid, hardenable material; solidifying the two layers, and then removing the low-melting temperature material to provide a duct for the heat-exchanging medium; the heat exchanger provided by this method has spaced layers of hardened material forming walls transverse to the layers of gas-pervious material which is embedded in the plane of said walls.

---

The invention relates to a method of manufacturing a heat exchanger comprising one or more chambers for one heat-exchanging medium and one or more chambers for another heat-exchanging medium. The invention furthermore relates to a heat exchanger manufactured by said method.

There is known a great variety of constructions of heat exchangers in which heat is exchanged between two or more media flowing through separate chambers. It is desirable for the temperatures of the media entering and leaving the heat exchanger on one side to differ as little as possible from each other. The efficiency of the heat exchanger is, in general, higher, the larger is the heat-transferring surface. An enlargement of the heat-transferring surface involves, in general, very bulky heat exchangers, which are often not acceptable for structural reasons.

In order to enlarge the heat-transferring surface without the need for building a voluminous construction it has been proposed to fill out the chambers of the heat exchanger with a stack of gas-pervious layers, preferably gauze of a material of good thermal conductivity. The stacks are brought into good thermal contact with the partition between the channels; for example by soldering the stacks to this partition. In this construction there is a very large contact surface between the medium and the gauze material. However, there is still a given heat resistance between the gauze and the partition, which resistance has to be overcome twice by the heat passing from one chamber to the other. The obviation of this heat resistance could further improve the efficiency of this heat exchanger.

The invention has for its object to provide said improvement and is characterized in that a stack of gas-pervious layers, preferably gauze of a material of good thermal conductivity is provided at least partly within an envelope which may be temporary, in which envelope, layers of a material of comparatively low melting point and layers of a hardening material are alternately provided in the liquid state, passing over from one material to the other being delayed until the material first applied has solidified or hardened into one or more solid layers respectively, while after the application of one or more layers of the hardening material the formed layer(s) of low melting point is (are) removed wholly or partly.

This method can be carried out very easily and it provides a heat exchanger having a very large heat-transferring surface, while the heat can pass from one chamber to the other through the material of the gas-pervious layers, that is to say that there is no need for overcoming a heat resistance at the partition. It has been found that this heat exchanger has a very high degree of efficiency, while its construction is very compact.

The term hardening material is to be understood in this specification to mean a material which is liquid at the temperature lower than the melting point of the material of the provisional layers, in which state it can be supplied, while it hardens at a temperature which is also lower than said melting point. Examples of this kind of substances are epoxy resins hardening in the cold or in the hot state and water-glass. An epoxy resin hardening in the cold state is, for example the lime known under the trade name of "Araldite." An advantage of said substances is that they have a low heat conducting coefficient. In the resultant heat exchanger heat conduction in the direction of flow will thus substantially not occur, which has, of course, a favourable effect on the efficiency.

In an advantageous embodiment of the method, in which the stack of gas-pervious layers has a cylindrical shape, this stack is rotated, after having been arranged in an envelope, so that the supplied liquid material is swung by the centrifugal force against the envelope or the layers already formed, so that layers of annular section are formed.

In this method it is advantageous to rotate the stack first with its axis in upright position, so that the liquid material can flow more easily in the axial direction, while after the supply of liquid material the stack is tilted so that the rotation is then performed about a horizontal axis and a layer of the same thickness throughout the length is obtained. In order to further the passage of the liquid material in the axial direction, in a further embodiment, a flow of gas is led in said direction through the stack.

If the stack of gas-pervious layers has a quadrangular sectional area, at least three side walls of the stack in a further advantageous embodiment are enveloped, the envelope being provided with head faces; the supplied liquid forms layers under the action of the force of gravitation.

After the layers of low melting point have been removed, the stack is turned, in a further embodiment, through a given angle about its axis, after which layers of said materials are again formed alternately, which are at an angle to the layers previously formed.

In a further advantageous method embodying the invention in which the gas-pervious layers are formed by gauzes the layers, first formed extend in the direction of one set of wires of the gauzes, whereas the layers subsequently formed extend in the direction of the other set of wires of the gauzes. With respect to the direction of the gauze wires the chamber walls are thus positioned to the optimum for the heat transfer.

The invention furthermore relates to a heat exchanger manufactured by the method described above. This heat exchanger is characterized in that it is formed by a stack of gas-pervious layers, preferably gauzes of a material of good thermal conductivity, the walls between the chambers consisting of cast material of low heat conduction coefficient and extending in a direction transverse of the gas-pervious layers. The heat exchanger according to the invention has a very high efficiency and a compact structure.

The invention will be described more fully with reference to the drawing.

Figure 1A:
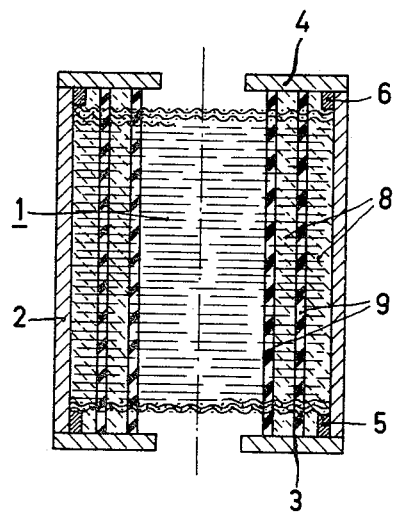
FIG. 1 shows diagrammatically how a cylindrical gauze stack may be provided with alternating layers.

Referring to FIG. 1, reference numeral 1 designates a stack of gauzes. This stack is surrounded by an envelope 2, which terminates at both ends in the head faces 3 and 4. The stack 1 is held by spacing rings 5 and 6 so that a given distance is left between the stack and said head faces. The stack and the envelope are rotated and a quantity of liquid wax is introduced into the envelope. The wax may be supplied in various ways. It is most advantageous, however, to supply the liquid, for example with the aid of a hose, so that the liquid enters the stack approximately at the radius where the wall has to be formed. Owing to the rotation the liquid wax is urged against the envelope, so that a uniform wall 8 is formed.

After a sufficient quantity of liquid wax has been supplied, the stack is tilted, while rotated, so that the axis takes up a horizontal position. This is conducive to a uniform distribution of the liquid wax. The process is then stopped to permit the wax to solidify. If the material is less viscous, the stack may be directly arranged in a horizontal position. The material will then nevertheless easily pass through the gauze. Then the stack is turned back into the vertical position.

Liquid epoxy resin of the kind commercially available under the trademark of "Araldite" is then supplied and the same process is carried out as for the wax, so that a layer 9 is formed. If the epoxy resin is too viscous, so that it can traverse the gauze only with difficulty, it may be mixed, if necessary, with a diluent, so that a satisfactorily flowing mixture is obtained. Then again a layer of wax may be applied and so forth.

After the application of the last layer of epoxy resin the rotation is stopped and the stack is removed from the envelope. By heating the stack the wax melts, and after the removal of the wax a stack gauze is obtained, which has a plurality of chambers separated from each other by epoxy resin walls 9.

Figure 2:
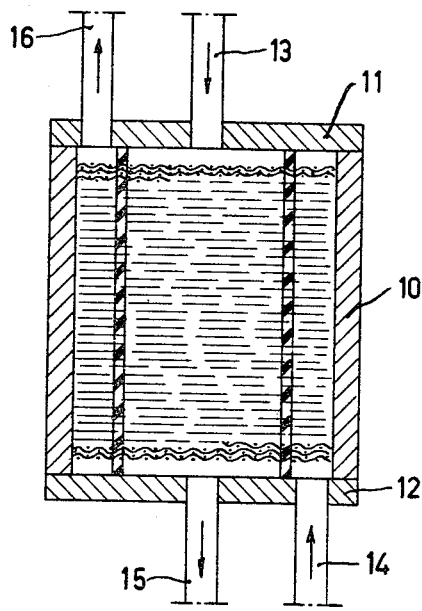
FIGS. 2 to 7 show diagrammatically how a quadrangular-section gauze stack is provided with chambers.

This stack can be arranged in a housing 10, which is provided at both ends with lids 11 and 12, in which the supply openings 13 and 14 for the two media and the outlet openings 15 and 16 are provided. This is shown in FIG. 2 for a heat exchanger having two chambers for the sake of clarity, since the lids of heat exchangers having a plurality of chambers give rise to complicated drawings.

Figure 1B:
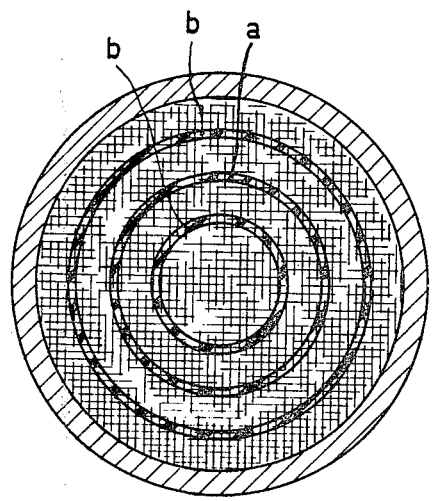

In the method described with reference to FIG. 1 the layers are formed alternately in order of succession from the outer side of the stack to the interior and one layer at a time. It is also possible to carry out processes in which the number of layers applied simultaneously increases with the number of applied layers. This is illustrated in FIG. 1b. In this process first a wax layer of given thickness is applied to the envelope 2. To this layer is applied the epoxy resin layer a. Then part of the thick wax layer is melted and removed, while to the layer a is applied a second wax layer. Subsequently, the epoxy resin layers b are applied, that is to say two layers at a time. During the next step four layers may be applied simultaneously and so on.

It will be apparent from the figures that the gauzes made of copper extend across the epoxy resin walls from one chamber to the other which ensures a very good heat exchange. Instead of using epoxy resin, other hardening substances having a low heat conduction coefficient may, of course, be employed. Water-glass, for example, is also quite suitable.

Figure 3:
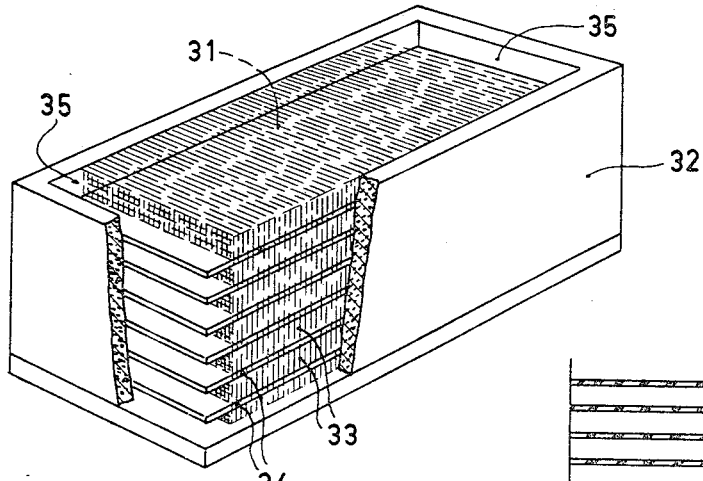

FIG. 3 illustrates how a gauze stack of quadrangular section is provided with alternating layers of wax and epoxy resin. For this purpose the gauze stack 31 is arranged in an envelope 32, which may be open, for example, at the upper end. Wax layers 33 and epoxy resin layers 34 are alternately applied in the envelope by casting said substances in the liquid state into the envelope. Casting is facilitated by the space 35 left between the head faces of the gauze stack and the head faces of the envelope, and the liquid cast into said space will then flow through the stack. If this flow is too slow, the assembly may temporarily be held in oblique position, so that flowing is performed more rapidly. Owing to the spaces 35 the layers formed will project from the stack. This is advantageous, when the stack is subsequently mounted in the housing of the heat exchanger. The projecting walls can thus engage the lids and form a seal. The layers may again be applied by various processes. The layers may, for example, be applied one by one, starting at the bottom of the envelope.

Figure 4:
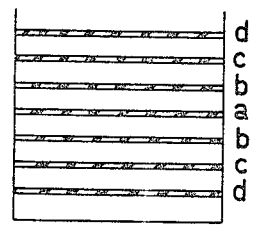

A more rapid process is shown in FIG. 4. First the layer a is applied, then the layer b, subsequently the layers c and afterwards the layers d. Each time two layers are applied simultaneously.

Figure 5:
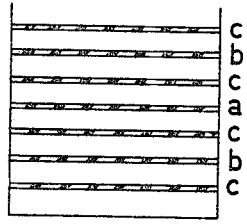

A still more rapid method is shown diagrammatically in FIG. 5. First a layer a is applied and subsequently the two layers b and finally the four layers c are applied. In these two methods, like in the method illustrated in FIG. 2, wax layers have to be applied and partly removed intermittently.

Figure 7:
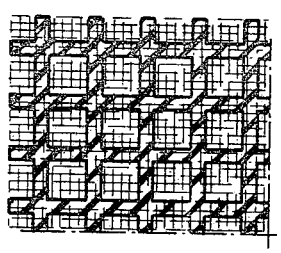
Figure 6:
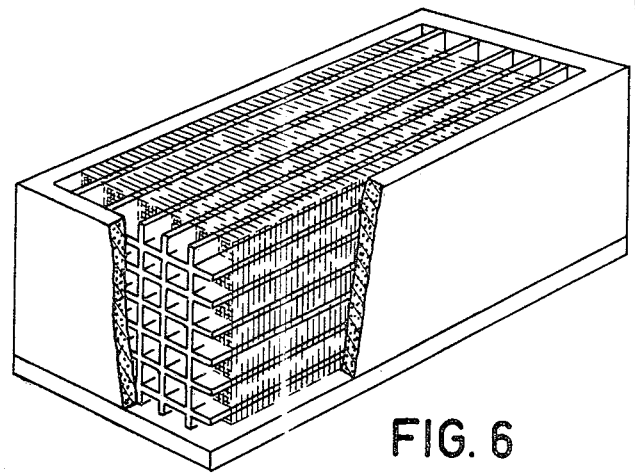

The stack shown in FIGS. 3, 4 and 5 is removed from the envelope after the last layer of epoxy resin has been applied and the last wax layers are removed. The resultant stack comprises a number of parallel walls. This stack can then be turned through 90° and reintroduced into the jig, after which again one of the methods of FIGS. 3, 4 and 5 is carried out. At the termination the gauze stack obtained has rectangular chambers as shown in FIGURE 6. An enlarged section is shown diagrammatically in FIG. 7.

The gauze stack has been turned through 90° before the second set of walls is provided. It is supposed here that the stack is composed of gauzes, the warp and woof of which are at an angle of 90° to each other. From FIG. 7 it will be apparent that the direction of the wires of the guaze is then at right angles to the partition, so that a satisfactory heat transfer from one chamber to the other is ensured, and all wires are loaded equally.

The resultant stack can again be arranged in a housing which has lids with the desired pattern of connections, as is shown in FIG. 2 for a two-chamber heat exchanger.

What is claimed is:

1. A method of manufacturing a heat exchanger having separate first and second chambers for first and second heat exchanging mediums comprising the steps:
   (a) providing within an envelope a porous material having good thermal conductivity;
   (b) flowing into the envelope and porous material a first liquid having a first melting temperature;
   (c) forming said liquid into a first layer traversing said porous material;
   (d) solidifying said first layer;
   (e) flowing into said envelope and porous material a second liquid which is solidifiable at a temperature below the melting temperature of said first liquid, and subsequently has a melting temperature higher than that of said first liquid;
   (f) forming said second liquid into a second and permanent layer generally adjacent the first layer having a predetermined thickness and traversing the porous material;
   (g) solidifying said second layer; and
   (h) removing at least part of said first layer by melting same whereby the second layer forms a partition defining said separate chambers, for forming at least one of said ducts.

2. A method as defined in claim 1 comprising the further steps of forming said porous material by stacking sheets of gas-pervious material wherein said gas-pervious material is formed of stacked layers in generally parallel planes, said first and second layers being transverse said stacked sheets.

3. A method as defined in claim 2 comprising the further steps of forming and solidifying a plurality of first and second layers alternately, and removing said first layers, thereby forming a plurality of spaced chambers in the spaces where said first layers are removed.

4. A method as defined in claim 2 wherein the envelope and stack of gas-pervious sheets have a round cylindrical shape and a central axis with the sheets transverse to the axis, the envelope being closed at opposite ends by annular head faces secured thereto, comprising the further step of rotating said stack about said axis thereby moving each liquid material by centrifugal force to form annular first and second layers, each layer after the first disposed against the layer previously formed.

5. A method as defined in claim 4 comprising the further steps:
  (a) positioning said stacked sheets and envelope with said axis substantially vertical, while said liquid material is flowed therein; and
  (b) subsequently tilting said envelope with said axis horizontal and further rotating said stack to form said annular layers.

6. A method as defined in claim 4 for forming supplementary permanent layers transverse to said second layers, comprising the further step:
  (a) changing the position of said envelope and stack by about 90° after having removed the first layers;
  (b) forming said supplementary layers similarly to said second layers and transverse thereto.

7. A method as defined in claim 2 wherein portions of said stack of gas-pervious layers intersecting the planes of said layers of hardenable material are embedded therein.

8. A method of manufacturing a heat exchanger as defined in claim 2 comprising the further steps of: directing a gas stream in an axial direction through said stack in order to further the flow of said liquid material in said axial direction.

9. A method of manufacturing a heat exchanger as defined in claim 2 wherein said second liquid is chosen from a substance having a low heat conduction coefficient.

10. A method of manufacturing a heat exchanger as defined in claim 9 wherein said second liquid is an epoxy resin.

11. A method of manufacturing a heat exchanger as defined in claim 9 wherein said second liquid is a water glass.

12. A method of manufacturing a heat exchanger as claimed in claim 1 wherein said material of low melting point is a wax.

References Cited

UNITED STATES PATENTS

| | | | |
|---|---|---|---|
| 1,161,756 | 11/1915 | Wolever | 264—311 |
| 1,734,274 | 11/1929 | Schubart | 165—166 |
| 2,385,830 | 10/1945 | Moore et al. | 264—317 |
| 2,946,094 | 7/1960 | Kawasaki | 264—317 X |
| 3,228,460 | 1/1966 | Garwin | 165—154 |

ROBERT F. WHITE, Primary Examiner

K. J. HOVET, Assistant Examiner

U.S. Cl. X.R.

165—165; 264—263, 270, 317